(12) United States Patent
Kidachi

(10) Patent No.: US 10,219,452 B2
(45) Date of Patent: Mar. 5, 2019

(54) DRIP IRRIGATION EMITTER AND DRIP IRRIGATION DEVICE EQUIPPED WITH SAME

(71) Applicant: Enplas Corporation, Saitama (JP)

(72) Inventor: Masahiro Kidachi, Saitama (JP)

(73) Assignee: ENPLAS CORPORATION, Saitama (JP)

( * ) Notice: Subject to any disclaimer, the term of this patent is extended or adjusted under 35 U.S.C. 154(b) by 623 days.

(21) Appl. No.: 14/402,706

(22) PCT Filed: May 24, 2013

(86) PCT No.: PCT/JP2013/003305
§ 371 (c)(1),
(2) Date: Nov. 21, 2014

(87) PCT Pub. No.: WO2013/175802
PCT Pub. Date: Nov. 28, 2013

(65) Prior Publication Data
US 2015/0150199 A1  Jun. 4, 2015

(30) Foreign Application Priority Data

May 24, 2012 (JP) .................................. 2012-118551
May 24, 2012 (JP) .................................. 2012-118552

(51) Int. Cl.
*A01G 25/02* (2006.01)

(52) U.S. Cl.
CPC ............ *A01G 25/023* (2013.01); *A01G 25/02* (2013.01); *A01G 25/026* (2013.01); *Y02A 40/237* (2018.01)

(58) Field of Classification Search
CPC ...... A01G 25/02; A01G 25/023; A01G 25/06; A01G 25/026; Y02A 40/237

(Continued)

(56) References Cited

U.S. PATENT DOCUMENTS 4,626,130 A * 12/1986 Chapin ................... A01G 25/02
                                                      239/542
4,687,143 A *  8/1987 Gorney ................ A01G 25/023
                                                      239/542

(Continued)

FOREIGN PATENT DOCUMENTS

| EP | 0467386 A2 | 1/1992 |
| EP | 2901851 A1 | 8/2015 |
| JP | 2010-046094 A | 3/2010 |

OTHER PUBLICATIONS

Extended European Search Report for EP 13793971.6 dated Dec. 17, 2015.

*Primary Examiner* — Steven J Ganey
*Assistant Examiner* — Christopher R Dandridge
(74) *Attorney, Agent, or Firm* — Brundidge & Stanger, P.C.

(57) ABSTRACT

A drip irrigation emitter (1), which comprises a low pressure stop filter (5), a pressure reduction channel (8), and a diaphragm (10), is disposed on the inner wall surface of a flow pipe (3) through which the irrigation liquid flows. The low pressure stop filter (5) has a hydrophobic surface and prevents inflow of the irrigation liquid when the fluid pressure is lower than an established value. The pressure reduction channel (8) reduces the pressure of the irrigation liquid. The diaphragm (10) changes the degree of opening of the pressure reduction channel (8) according to the fluid pressure of the irrigation liquid. The drip irrigation emitter (1) can be manufactured at low cost as a result of being a one-piece molding. The drip irrigation device comprising the drip irrigation emitter (1) stably ejects the irrigation liquid even when the liquid pressure is low.

9 Claims, 12 Drawing Sheets

(58) Field of Classification Search
USPC .............................. 239/542, 533.1, 570, 571
See application file for complete search history.

(56) References Cited

U.S. PATENT DOCUMENTS

| | | | | |
|---|---|---|---|---|
| 5,183,208 | A * | 2/1993 | Cohen | A01G 25/023 239/542 |
| 5,203,503 | A * | 4/1993 | Cohen | A01G 25/023 239/1 |
| 5,586,727 | A | 12/1996 | Shekalim | |
| 5,820,028 | A * | 10/1998 | Dinur | B05B 1/083 239/542 |
| 6,027,048 | A | 2/2000 | Mehoudar | |
| 6,206,305 | B1 | 3/2001 | Mehoudar | |
| 2002/0088877 | A1 * | 7/2002 | Bertolotti | A01G 25/023 239/542 |
| 2010/0155508 | A1 | 6/2010 | Keren | |
| 2011/0186652 | A1 * | 8/2011 | Cohen | A01G 25/023 239/542 |
| 2012/0305676 | A1 * | 12/2012 | Keren | A01G 25/023 239/542 |

* cited by examiner

DRIP IRRIGATION EMITTER AND DRIP IRRIGATION DEVICE EQUIPPED WITH SAME

TECHNICAL FIELD

The present invention relates to a drip irrigation emitter and a drip irrigation apparatus including the drip irrigation emitter, and particularly to a drip irrigation emitter and a drip irrigation apparatus including the drip irrigation emitter which are suitable for growing plants.

BACKGROUND ART

Conventionally, drip irrigation systems (also known as trickle irrigation systems or micro irrigation systems) have been employed to supply water and irrigation liquid such as liquid fertilizer to the plants to be grown into the soil in the agricultural land, the plantation or the like.

In such drip irrigation systems, for example, a filter, a fertigation apparatus (a chemigation apparatus if necessary), a back flow prevention apparatus, a main pipe, and the like are connected in sequence on the downstream side of a pump that brings up water from the water source, and an elongated drip watering tube is connected to the channel terminal. In addition, the drip watering tube is laid on the soil in which plants are grown.

Here, the drip watering tube ejects the irrigation liquid in the tube main body at a predetermined ejection rate (or ejection speed) per unit time from a plurality of ejection ports provided to the elongated tube main body at predetermined intervals along the longitudinal direction of the tube main body. Thus, the irrigation liquid is slowly supplied to the soil outside of the drip watering tube (that is, drip irrigation is performed).

With such a drip watering tube, water and fertilizer can be saved. In addition, by supplying water at a moderate supply speed, the oxygen required for plant roots can be ensured in the soil. As a result, the growing of plants can be favorably managed.

In such a drip watering tube, a drip irrigation emitter for controlling the ejection amount of the irrigation liquid from each ejection port per unit time is provided at each ejection port.

In this drip irrigation emitter, the irrigation liquid flowing in the tube main body flows in the drip irrigation emitter through the inlet and flows through a pressure reduction channel (which is called labyrinth) in the drip irrigation emitter in such a manner that the pressure of the irrigation liquid is reduced, and then, the irrigation liquid is ejected from the ejection port connected on the downstream side of the pressure reduction channel.

Some conventional drip irrigation emitters are provided with a so-called differential pressure control mechanism (pressure correction function). Such conventional drip irrigation emitters have, for example, a three-component structure in which an elastic film (for example, silicone rubber film) such as a diaphragm is sandwiched by an inflow side member and an ejection side member, as with the drip irrigation emitter (emitter unit) disclosed in PTL 1.

The drip irrigation emitter disclosed in PTL 1 controls the opening/closing of the entrance port of the drip irrigation emitter and the flow rate from the exit port of the drip irrigation emitter, by the operation of a diaphragm (film) in accordance with the liquid pressure outside of the drip irrigation emitter and in a tube main body.

To be more specific, in the drip irrigation emitter disclosed in PTL 1, when the liquid pressure outside of the drip irrigation emitter is increased to a certain level, the diaphragm that is so disposed as to shield the entrance is deflected by the liquid pressure toward the outlet. As a result, the entrance is opened. When the liquid pressure is further increased, the amount of the deflection of the diaphragm toward the outlet is increased, and consequently the cross-sectional size of the channel in the outlet is reduced. As a result, the ejection amount is limited.

As disclosed in paragraph [0004] of PTL 1, in the drip irrigation emitter, the ejection speed of the irrigation liquid from the drip irrigation emitter (emitter) has substantially no relation with the variation in pressure of the irrigation liquid supplied to the drip irrigation emitter.

Therefore, the drip irrigation emitter has been expected to limit non-uniformity in the ejection amount of the irrigation liquid between the drip irrigation emitters disposed on the upstream side (high pressure side) and the downstream side (low pressure side) in the tube main body, to thereby uniformize the growing of plants in the entire soil.

CITATION LIST

Patent Literature

PTL 1
Japanese Patent Application Laid-Open No. 2010-46094

SUMMARY OF INVENTION

Technical Problem

However, the drip irrigation emitter disclosed in PTL 1 requires a relatively high liquid pressure to open the entrance by elastically deforming the diaphragm. Therefore, when used at a relatively high liquid pressure by using a high pressure pump, the drip irrigation emitter would function with no problem. However, when used at a low liquid pressure, the diaphragm cannot be elastically deformed in a proper manner, and therefore the drip irrigation emitter may not sufficiently function.

The drip irrigation emitter disclosed in PTL 1 has the following four problems.
(First Problem)

The drip irrigation emitter disclosed in PTL 1 requires a large number of components, and thus incurs increase in the size of the drip irrigation emitter (in particular, increase in the size in the height direction). When such a drip irrigation emitter is disposed in the tube main body, the area occupancy of the drip irrigation emitter in the tube main body with respect to the cross-section of the channel is naturally large.

In this manner, the drip irrigation emitter on the upstream side serves as a large hindrance laid on the channel and blocks the drip irrigation emitter on the downstream side from the irrigation liquid flowing in the tube main body. Thus, the drip irrigation emitter hinders the flow of the irrigation liquid, and consequently the pressure drop in the tube main body is undesirably increased.

Therefore, when a high pressure pump is not used, the drip irrigation emitter disclosed in PTL 1 cannot be used for a long-distance watering utilizing a considerably long drip watering tube. If the drip irrigation emitter disclosed in PTL 1 is used for the long-distance watering, the ejection amount of the irrigation liquid may be non-uniform.

(Second Problem)

In addition, the drip irrigation emitter disclosed in PTL 1 may have a problem of assembly error of the above-described three components. In this case, the operations of diaphragms (films) are non-uniform, and as a result, the ejection amount of the irrigation liquid is non-uniform.

(Third Problem)

Further, in the drip irrigation emitter disclosed in PTL 1, the material cost may be raised when silicone rubber is used for the diaphragm.

(Fourth Problem)

Furthermore, the drip irrigation emitter disclosed in PTL 1 requires the step of assembling the three components after the three components are separately manufactured, thus raising the manufacturing cost.

Given the above-mentioned problems, a first object of the present invention is to provide a drip irrigation emitter and a drip irrigation apparatus including the drip irrigation emitter which can properly perform drip irrigation even when the liquid pressure of irrigation liquid in the flow pipe is low.

A second object of the present invention is to provide a drip irrigation emitter and a drip irrigation apparatus including the drip irrigation emitter which can properly perform a long-distance irrigation even when the liquid pressure of irrigation liquid is low, can stabilize the ejection amount of the irrigation liquid, and can achieve cost reduction by reducing the manufacturing cost, number of components and manufacturing steps.

Solution to Problem

To achieve the first objet, the present invention provides the following drip irrigation emitter.

[1] A drip irrigation emitter for controlling an amount of irrigation liquid ejected through an ejection port of a flow pipe through which the irrigation liquid flows, the ejection port extending through a pipe wall of the flow pipe, the drip irrigation emitter comprising: a flow channel that allows the irrigation liquid to flow from an inside of the flow pipe to the ejection port when the drip irrigation emitter is disposed at a position corresponding to the ejection port in an inner peripheral surface of the flow pipe; when the drip irrigation emitter is disposed at a position corresponding to the ejection port in an inner peripheral surface of the flow pipe; an inflow part for introducing the irrigation liquid in the flow pipe into the flow channel; a pressure reduction channel part disposed on a downstream side relative to the inflow part in the channel, the pressure reduction channel part being configured to define a pressure reduction channel, the pressure reduction channel being configured to allow the irrigation liquid entered from the inflow part to flow therethrough toward the ejection port while reducing a pressure of the irrigation liquid; a first plane to be connected to the inner peripheral surface of the flow pipe; and a second plane to be located on a central axis side of the flow pipe relative to the first plane, wherein the inflow part is disposed at the second plane, has hydrophobicity, and prevents the irrigation liquid having a liquid pressure lower than a predetermined liquid pressure from being introduced into the flow channel.

[2] The drip irrigation emitter according to [1], wherein the inflow part includes a substrate part, and a plurality of inlets that extend through the substrate part, the substrate part includes a front surface included in the second plane, and a rear surface facing the channel, wherein at least the front surface has hydrophobicity.

[3] The drip irrigation emitter according to [2], wherein an inner peripheral surface of each of the inlets has hydrophobicity.

[4] The drip irrigation emitter according to [2] or [3], wherein the inflow part is composed of a hydrophobic material.

[5] The drip irrigation emitter according to [2] or [3], wherein hydrophobic coating is applied to the inflow part.

[6] The drip irrigation emitter according to [4] or [5], wherein the inflow part includes an irregularity provided on the surface having hydrophobicity.

[7] The drip irrigation emitter according to any one of [1] to [6] further including a diaphragm part disposed on a downstream side relative to the inflow part in the channel, the diaphragm part being configured to control a cross-sectional size of the flow channel through deformation of the diaphragm part in accordance with the liquid pressure of the irrigation liquid in the flow pipe.

[8] The drip irrigation emitter according to [7] further including an opening part that opens to the second plane, and connects the flow channel and an outside together, wherein the pressure reduction channel part includes a groove recessed from the first plane, the groove being configured to define the pressure reduction channel together with the inner peripheral surface of the flow pipe, the diaphragm part is disposed at the opening part such that the diaphragm part is partially exposed to the outside and that the diaphragm part is deformed toward the inner peripheral surface of the flow pipe that defines the pressure reduction channel, and the inflow part, the pressure reduction channel part and the diaphragm part are integrally formed with a resin material.

To achieve the second object, the present invention provides the following drip irrigation emitter.

[9] A drip irrigation emitter for controlling an amount of irrigation liquid ejected through an ejection port of a flow pipe through which the irrigation liquid flows, the ejection port extending through a pipe wall of the flow pipe, the drip irrigation emitter comprising: a flow channel that allows the irrigation liquid in the flow pipe to flow from an inside of the flow pipe to the ejection port when the drip irrigation emitter is disposed at a position corresponding to the ejection port in an inner peripheral surface of the flow pipe; an inflow part for introducing the irrigation liquid in the flow pipe into the flow channel; a pressure reduction channel part disposed on a downstream side relative to the inflow part in the channel, the pressure reduction channel part being configured to define a pressure reduction channel together with the inner peripheral surface of the flow pipe, the pressure reduction channel being configured to allow the irrigation liquid entered from the inflow part to flow therethrough toward the ejection port while reducing a pressure of the irrigation liquid; a diaphragm part disposed on a downstream side relative to the inflow part in the flow channel such that the diaphragm part is partially exposed in the flow pipe, that the diaphragm is exposed to the liquid pressure of the irrigation liquid in the flow pipe, and that the diaphragm is deformed toward the inner peripheral surface of the flow pipe, a first plane to be connected to the inner peripheral surface of the flow pipe; and a second plane to be located on a central axis side of the flow pipe relative to the first plane, wherein the inflow part is disposed at the second plane, the diaphragm part limits a height of the flow channel such that the height of the flow channel decreases as the liquid pressure increases by being deformed toward the inner peripheral surface of the flow pipe in accordance with the liquid pressure, and the inflow part, the pressure reduction channel part and the diaphragm part are integrally formed with a resin material.

[10] The drip irrigation emitter according to [9], wherein the diaphragm part is disposed between the ejection port and the pressure reduction channel part in the flow channel.

[11] The drip irrigation emitter according to claim 9 or 10, wherein the diaphragm part includes a thin central wall part having a curved shape protruding in a direction away from the inner peripheral surface of the flow pipe defining the pressure reduction channel, and a thin peripheral wall part connected to an outer peripheral edge of the central wall part in such a manner as to surround the central wall part, the peripheral wall part having a shape gradually expanding in the direction away from the inner peripheral surface of the flow pipe.

[12] The drip irrigation emitter according to [11] further including an opening part that opens to the second plane and connects the flow channel and an outside together, wherein the diaphragm part is so disposed at the opening part as to be partially exposed to the outside.

To achieve the first object or the second object, the present invention provides the following drip irrigation apparatus.

[13] A drip irrigation apparatus including: a flow pipe through which irrigation liquid flows, the flow pipe including an ejection port that extends through a pipe wall; and the drip irrigation emitter according to any one of [1] to [12] disposed on an inner peripheral surface of the flow pipe at a position corresponding to the ejection port, the drip irrigation emitter being configured to control an amount of the irrigation liquid ejected from the ejection port.

Advantageous Effects of Invention

According to the present invention, even when the liquid pressure of irrigation liquid in a flow pipe is low, drip irrigation can be properly performed.

With the invention according to [1], the lower limit of the liquid pressure of irrigation liquid that flows in the flow channel of the drip irrigation emitter main body can be controlled, by the hydrophobicity of the inflow part, to a level lower than that of a conventional art. Thus, even when the liquid pressure of the irrigation liquid in the flow pipe (in other words, outside of the flow channel of the drip irrigation emitter main body) is low, the irrigation liquid can be properly used for drip irrigation.

With the invention according to [2], a portion of the inflow part exposed to the irrigation liquid outside of the flow channel of the drip irrigation emitter main body has hydrophobicity. Thus, the inflow of the irrigation liquid into the flow channel of the drip irrigation emitter main body can be properly limited.

With the invention according to [3], capillarity at the inlet can be surely prevented and thus the inflow of the irrigation liquid can be properly limited.

With the invention according to [4], the hydrophobicity of the inflow part can be achieved with a small number of components.

With the invention according to [5], the hydrophobicity of the inflow part does not depend on the material of the inflow part, and thus the degree of freedom of selection of the material of the inflow part can be improved.

With the invention according to [6], the lower limit of the liquid pressure of the irrigation liquid that flows into the flow channel of the drip irrigation emitter main body can be adjusted to a slightly high level. Thus, the degree of freedom of selection of the liquid pressure in the case where the drip irrigation emitter is used under a low pressure can be improved.

With the invention according to [7], even when the drip irrigation emitter is used under a high pressure, the flow rate of the irrigation liquid toward the ejection port in the flow channel of the drip irrigation emitter can be limited by the diaphragm part. Thus, even when the drip irrigation emitter is used under a high pressure, the ejection amount of the irrigation liquid can be properly controlled.

With the invention according to [8], a small-sized and inexpensive drip irrigation emitter which is excellent in control of the ejection rate can be accurately manufactured with fewer steps by integral molding using a resin material. Thus, even when the liquid pressure of the irrigation liquid supplied into the flow pipe from the water source side is low, long-distance watering can be properly performed. In addition, the ejection amount of the irrigation liquid can be stabilized. Further, cost reduction can be achieved by reducing the manufacturing cost, number of components and manufacturing steps.

In addition, with the present invention, even when the liquid pressure of the irrigation liquid is low, long-distance watering can be properly performed, and in addition, the ejection amount of the irrigation liquid can be stabilized. Further, cost reduction can be achieved by reducing the manufacturing cost, number of components and manufacturing steps.

With the invention according to [9], the drip irrigation emitter can have a plate shape. Thus, pressure reduction by the pressure reduction channel and limitation on the height of the flow channel by the diaphragm part can be performed, and a small-sized and inexpensive drip irrigation emitter which is excellent in control of the ejection rate can be accurately manufactured with fewer steps by integral molding using a resin material. Therefore, even when the liquid pressure (in other words, flow pressure) of the irrigation liquid is low, long-distance watering can be properly performed. In addition, the ejection amount of the irrigation liquid can be stabilized. Further, cost reduction can be achieved by reducing the manufacturing cost, number of components and manufacturing steps.

With the invention according to [10], the diaphragm part disposed on the downstream side of the pressure reduction channel part can suitably and efficiency limit the height of the flow channel by utilizing the difference in pressure between the irrigation liquid in the flow channel whose pressure has been reduced by the pressure reduction channel, and the irrigation liquid outside of the flow channel to which the diaphragm part is exposed. In addition, the diaphragm part can be disposed at a position laterally shifted from a position immediately above ejection port. Thus, even when plant roots, small rocks, sand, insects and the like have intruded from the ejection port, it is possible to prevent the plant roots, small rocks, sand, insects and the like from having an influence on the operation of diaphragm part.

With the invention according to [11], the diaphragm part can be formed in a shape suitable for efficiently receiving the liquid pressure of the irrigation liquid outside of the flow channel and deforming toward the inner peripheral surface of the flow pipe. Thus, the height of the flow channel can be further properly limited.

With the invention according to [12], the diaphragm part can be readily disposed at a position near the inner peripheral surface of the flow pipe in such a manner that the liquid pressure of the irrigation liquid outside of the flow channel can be properly received. Thus, the deformation amount of the diaphragm part required for limitation on the height of the flow channel can be limited, and as a result, the durability of the thin diaphragm part can be ensured, thus achieving a longer lifetime of the drip irrigation emitter.

With the invention according to [13], even when the liquid pressure of the irrigation liquid in the flow pipe is low, drip irrigation can be properly performed. Alternatively, with the invention according to [13], even when the liquid pressure of the irrigation liquid is low, long-distance watering can be properly performed, and in addition, the ejection amount of the irrigation liquid can be stabilized. Further, reduction in manufacturing cost can be achieved.

DESCRIPTION OF EMBODIMENTS

In the following, a drip irrigation emitter according to Embodiment of the present invention and a drip irrigation apparatus including the drip irrigation emitter will be described with reference to FIGS. 1 to 12.

Figure 1:
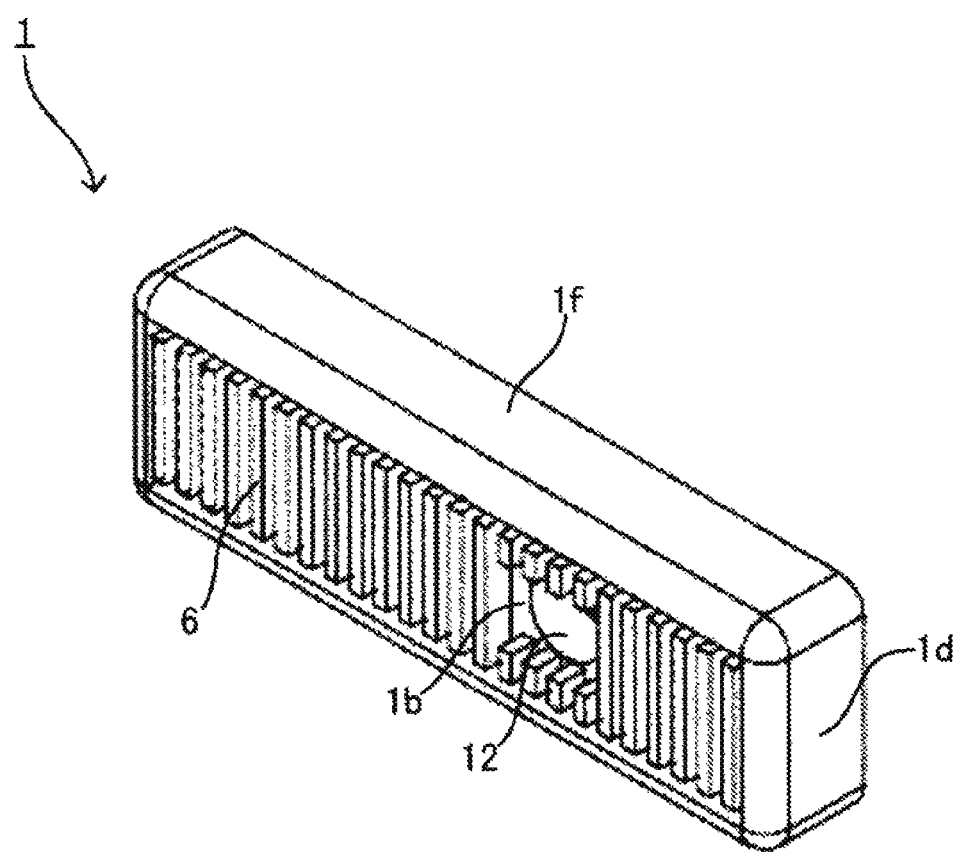
FIG. 1 is a perspective view of a drip irrigation emitter according to Embodiment of the present invention as viewed from the top side.
Figure 2:
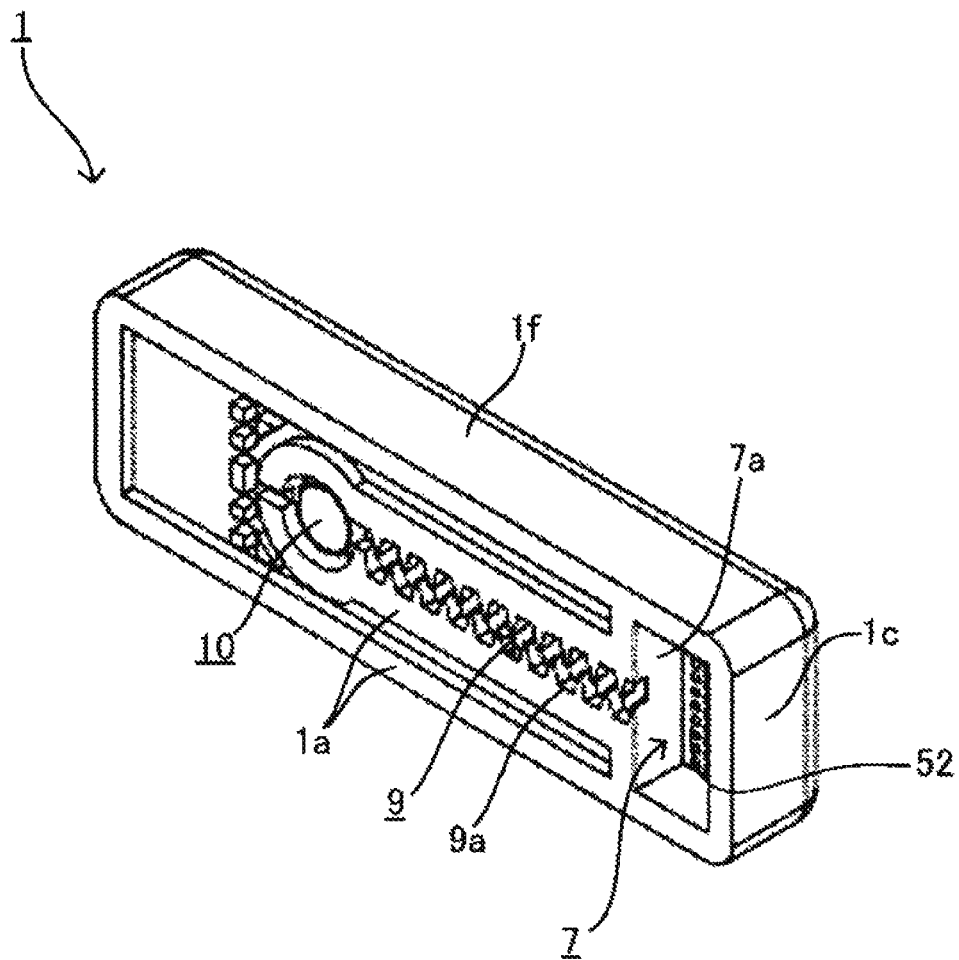
FIG. 2 is a perspective view of the drip irrigation emitter illustrated in FIG. 1 as viewed from the bottom side.
Figure 3:
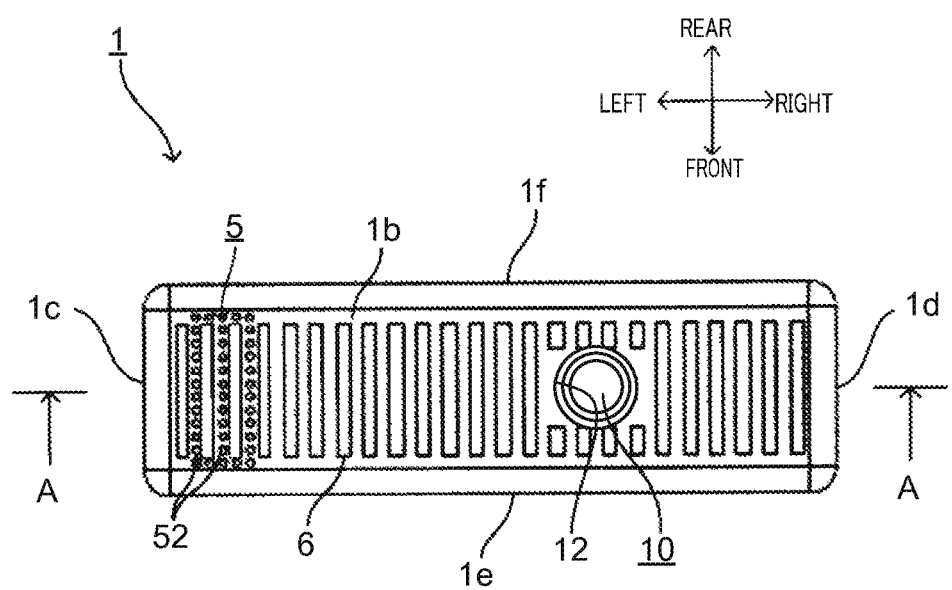
FIG. 3 is a plan view of the drip irrigation emitter illustrated in FIG. 1.
Figure 4:
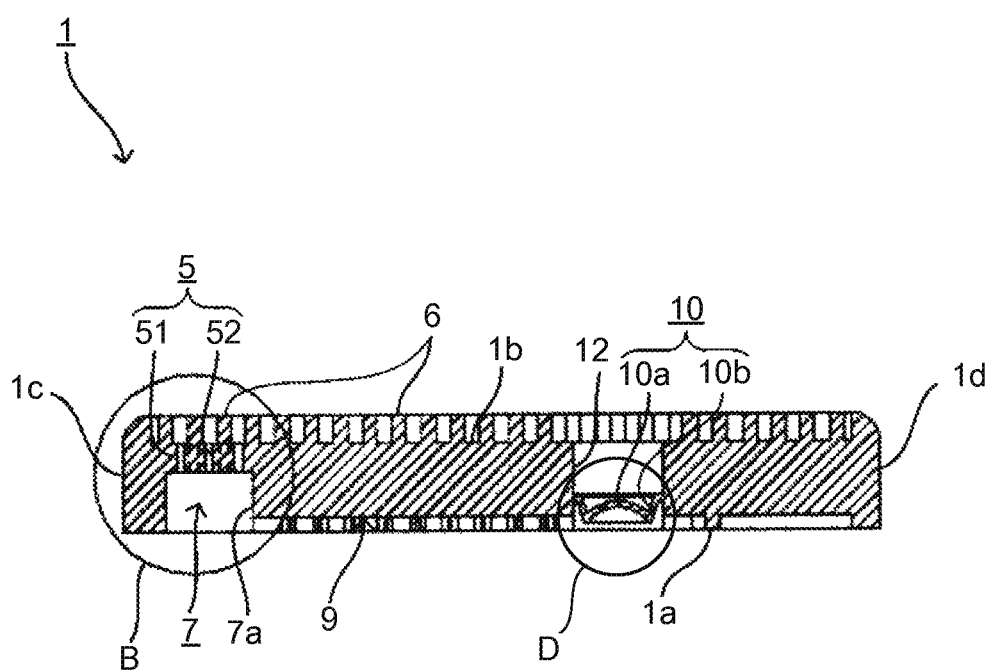
FIG. 4 is a sectional view of the drip irrigation emitter illustrated in FIG. 1 taken along line A-A of FIG. 3.
Figure 5:
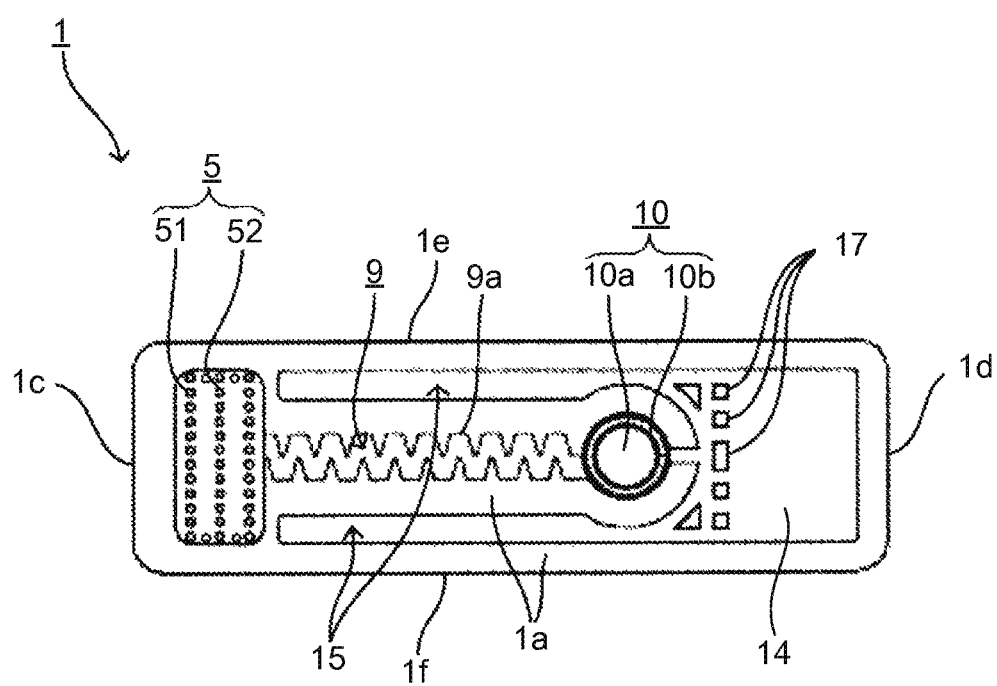
FIG. 5 is a bottom view of the drip irrigation emitter illustrated in FIG. 1.
Figure 6:
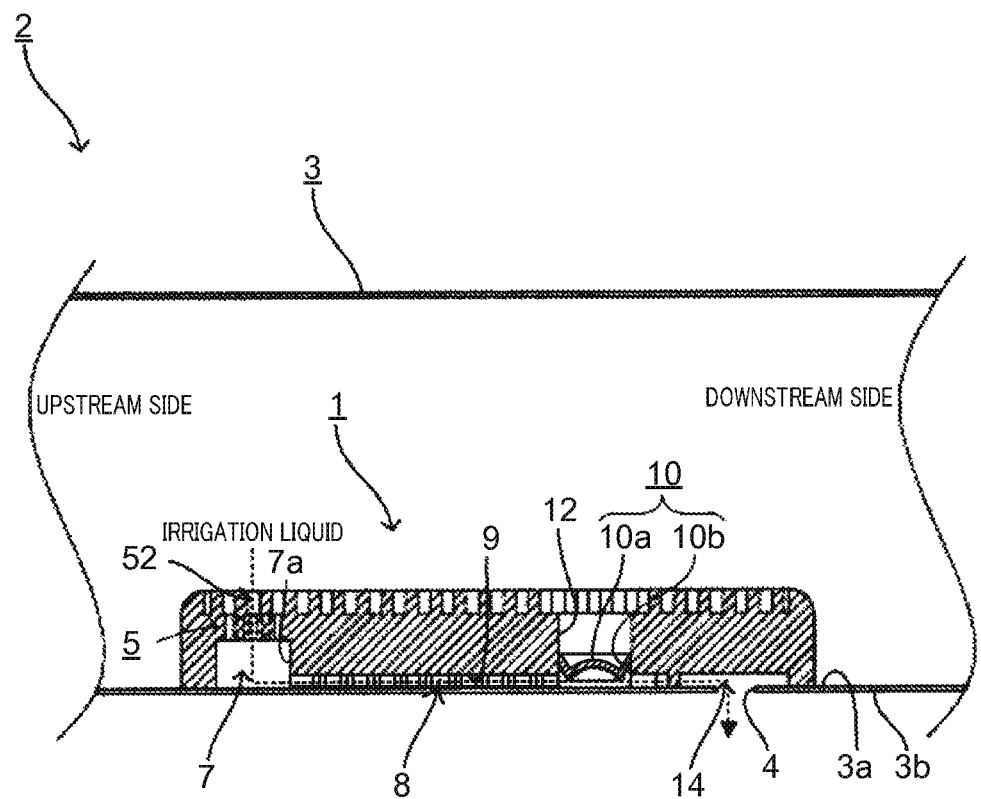
FIG. 6 is a sectional view schematically illustrating a drip irrigation apparatus according to Embodiment of the present invention.

FIG. 1 is a perspective view of drip irrigation emitter 1 in Embodiment as viewed from the top side of drip irrigation emitter 1. FIG. 2 is a perspective view of drip irrigation emitter 1 as viewed from the bottom side of drip irrigation emitter 1. FIG. 3 is a plan view of drip irrigation emitter 1. FIG. 4 is a sectional view of drip irrigation emitter 1 taken along line A-A of FIG. 3. FIG. 5 is a bottom view of drip irrigation emitter 1. FIG. 6 is a sectional view schematically illustrating drip watering tube 2 as the drip irrigation apparatus in Embodiment.

As illustrated in FIG. 6, drip watering tube 2 includes substantially cylindrical and elongated tube main body 3 serving as a flow pipe through which the irrigation liquid flows, and drip irrigation emitter 1 disposed in tube main body 3.

In addition, as illustrated in FIG. 6, drip irrigation emitter 1 is disposed on inner peripheral surface 3a of tube main body 3 at a position corresponding to ejection port 4 for irrigation liquid, in such a manner as to cover ejection port 4. Ejection port 4 penetrates inner peripheral surface 3a and outer peripheral surface 3b of tube main body 3 (in other words, extends through the pipe wall). Drip irrigation emitter 1 is configured to control the ejection rate per unit time of the irrigation liquid from the position corresponding to ejection port 4.

It is to be noted that, while FIG. 6 illustrates one drip irrigation emitter 1 and one ejection port 4 for convenience, a plurality of drip irrigation emitters 1 and a plurality of ejection ports 4 are disposed along the longitudinal direction of tube main body 3 at predetermined intervals.

In addition, in FIG. 6, the left and right sides to the sheet of FIG. 6 of the channel in tube main body 3 correspond to the upstream (water source) side and the downstream side, respectively.

Further, in Embodiment, drip irrigation emitter 1 is integrally formed by resin molding using a metal mold. Examples of the resin material used for the resin molding include inexpensive materials such as polypropylene. In addition, examples of the molding method include injection molding.

Furthermore, as illustrated in FIG. 1 to FIG. 6, drip irrigation emitter (drip irrigation emitter main body) 1 has a substantially cuboid plate shape in appearance.

That is, as illustrated in FIG. 1 to FIG. 6, drip irrigation emitter 1 has an external shape roughly surrounded by bottom end surface 1a as the first plane, top surface 1b as the second plane, left side surface 1c, right side surface 1d, front side surface 1e, and rear side surface 1f. Regarding the vertical and lateral positional relationship among the surfaces, see the cross arrow of FIG. 3. As illustrated in FIG. 1 to FIG. 6, top surface 1b and bottom end surface 1a, left side surface 1c and right side surface 1d, and front side surface 1e and rear side surface 1f are respectively in parallel to each other. In addition, top surface 1b and bottom end surface 1a are perpendicular to left side surface 1c, right side surface 1d, front side surface 1e, and rear side surface 1f. Further, top surface 1b and bottom end surface 1a are elongated in the left-right direction.

Drip irrigation emitter 1 is jointed to inner peripheral surface 3a of tube main body 3 through bottom end surface 1a. Top surface 1b is located on the side opposite to bottom end surface 1a, in other words, on the side closer to the central axis of tube main body 3 relative to bottom end surface 1a. In the case where tube main body 3 is formed by extrusion molding using a resin material (such as polyethylene) having a fusing point lower than that of drip irrigation emitter 1, the jointing of drip irrigation emitter 1 may be completed simultaneously with the curing of tube main body 3, with ready-made drip irrigation emitter 1 disposed on inner peripheral surface 3a of tube main body 3 to be cured.

<Details of Configuration of Inflow Part>

As illustrated in FIG. 3 and FIG. 4, drip irrigation emitter 1 includes low-pressure stop filter part 5 provided at a position in the vicinity of a left end portion on top surface 1b. Low-pressure stop filter part 5 serves as an inflow part that allows the irrigation liquid in tube main body 3 to flow into a flow channel of drip irrigation emitter 1.

Figure 7:
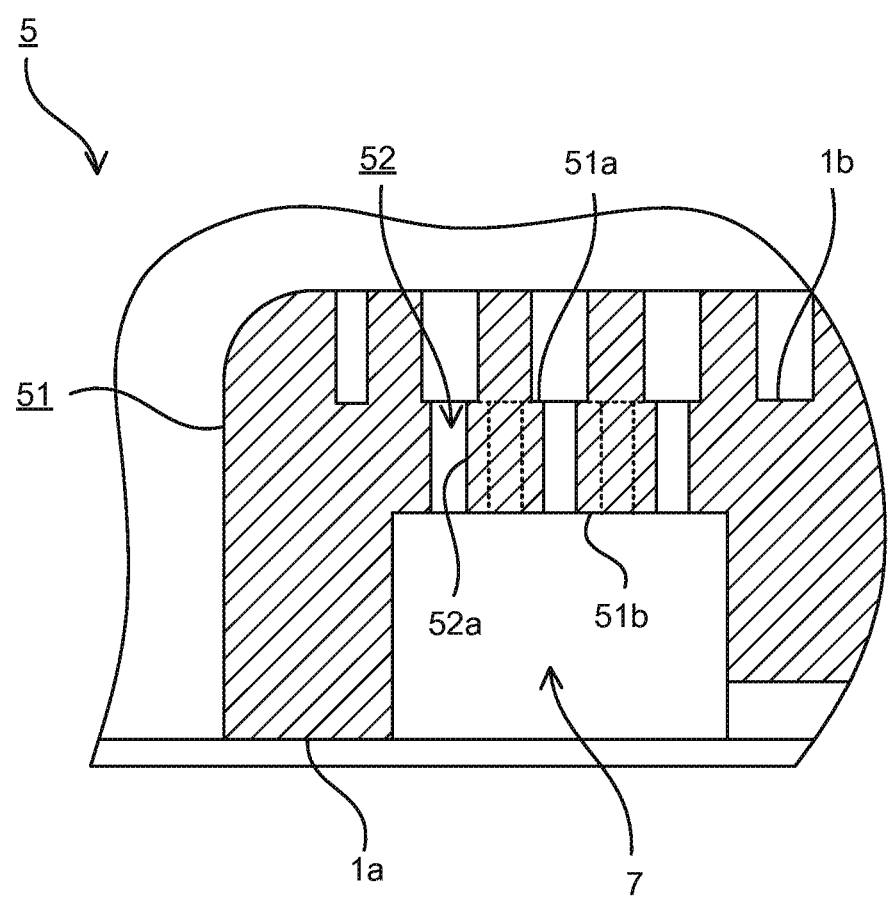
FIG. 7 is an enlarged cross sectional view of a low-pressure stop filter part (corresponding to frame B of FIG. 4)

As illustrated in FIG. 7, low-pressure stop filter part 5 includes horizontal filter substrate part 51 and a plurality of inlets 52. Each inlet 52 is a circular pore that perpendicularly penetrates surface 51a and rear surface 51b, that is, extends through filter substrate part 51. Filter substrate part 51 includes surface 51a flush with top surface 1b, and rear surface 51b located on the side opposite to surface 51a. Surface 51a is included in top surface 1b, and rear surface 51b faces hollow part 7 described later. The inner space of each inlet 52 defines a starting end of the flow channel of drip irrigation emitter 1.

Here, as illustrated in FIG. 3 to FIG. 7, inlets 52 are aligned in a front-rear direction (vertical direction in FIG. 3 and FIG. 5) at even intervals, and are also aligned in a left-right direction at even intervals. Thus, inlets 52 are disposed in a matrix.

In addition, as illustrated in FIG. 3, FIG. 4 and FIG. 7, a plurality of plate-shaped protrusions 6 each of which are perpendicularly protruded toward the upside and elongated in a front-rear direction are aligned on top surface 1b including surface 51a of filter substrate part 51 in the longitudinal direction (left and right) of top surface 1b at even intervals. Protrusions 6 functions as a filter that prevents relatively large foreign matters from flowing into the flow channel of drip irrigation emitter 1.

<Low-pressure Stop Filter>

Low-pressure stop filter part 5 has a function (low-pressure stop filter function) of preventing irrigation liquid having a pressure lower than a predetermined pressure (which is also referred to as "liquid pressure," and is, for example, 0.005 MPa) from flowing into the flow channel of drip irrigation emitter 1.

Examples of the manner embodying the low-pressure stop filter function are as follows.

For example, in the case where drip irrigation emitter 1 is made of the above-described polypropylene, polypropylene itself is a highly-hydrophobic material (that is, hydrophobic material) having low surface energy. For this reason, the low-pressure stop filter function may be easily provided to the entirety of low-pressure stop filter part 5.

Figure 8:
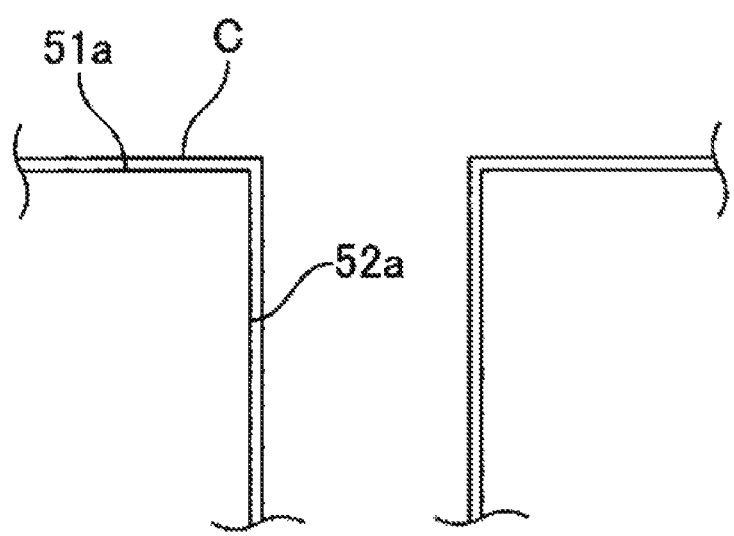
FIG. 8 is an enlarged cross sectional view illustrating a first modification of the low-pressure stop filter part.

As another example, as illustrated in FIG. 8, hydrophobic coating C such as fluorine coating using a fluorine coating agent or the like is applied to surface 51a of filter substrate part 51 and, if necessary, inner peripheral surface 52a of inlet 52, to thereby reduce the surface energy. In this manner, a low-pressure stop filter function can be locally provided to low-pressure stop filter part 5.

Figure 9:
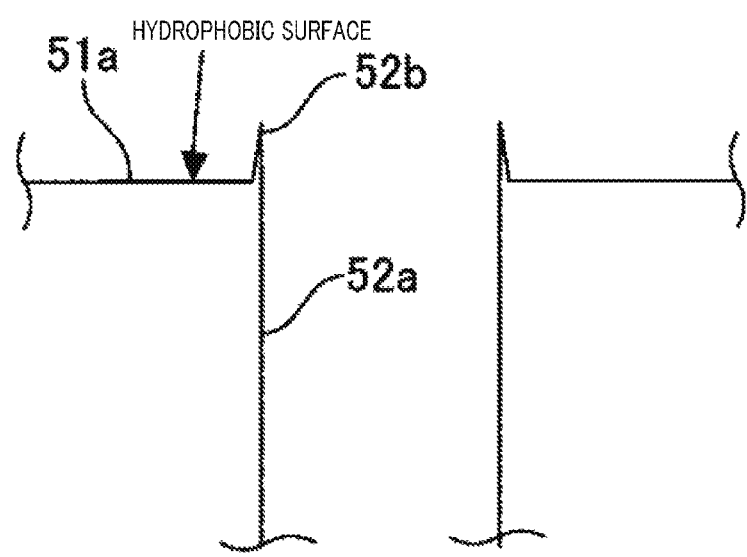
FIG. 9 is an enlarged cross sectional view illustrating a second modification of the low-pressure stop filter part.

In addition, in the case of using the hydrophobic material or the case of using the hydrophobic coating, it is possible to form irregularity on the surface having hydrophobicity to increase the hydrophobicity as necessary. The "surface having hydrophobicity" is, for example, a surface composed of a hydrophobic material, or a surface on which hydrophobic coating is applied. The irregularity may be burrs 52b provided at the upper portion of the opening edge of inlet 52 as illustrated in FIG. 9, or irregularity which is formed so as to reflect irregularity provided in a metal mold.

Further, in addition to the above-described examples, the low-pressure stop filter function may be optimized by adjusting the internal diameter, pitch, number, shape of the opening, thickness, or the like of inlet 52.

When the liquid pressure of the irrigation liquid in tube main body 3 is increased to a predetermined pressure (fracture hydraulic pressure), low-pressure stop filter part 5 allows the irrigation liquid to flow into the flow channel of drip irrigation emitter 1 through inlet 52. Here, from the viewpoint of favorably operating drip irrigation emitter 1 under a low pressure, it is desirable to select a sufficiently low pressure of about 0.005 MPa as exemplified above, for the predetermined pressure. It should be noted that the predetermined pressure may differ depending on the degree of the hydrophobicity of low-pressure stop filter part 5.

Therefore, when providing low-pressure stop filter part 5 with hydrophobicity, it is possible to select, on the basis of experiments, elements relating to the required hydrophobicity (the material of the above-described low-pressure stop filter part 5, the kind and thickness of the hydrophobic coating, form of the surface having the hydrophobicity, and the like) in consideration of the relationship with a predetermined pressure to be set.

Figure 10A:
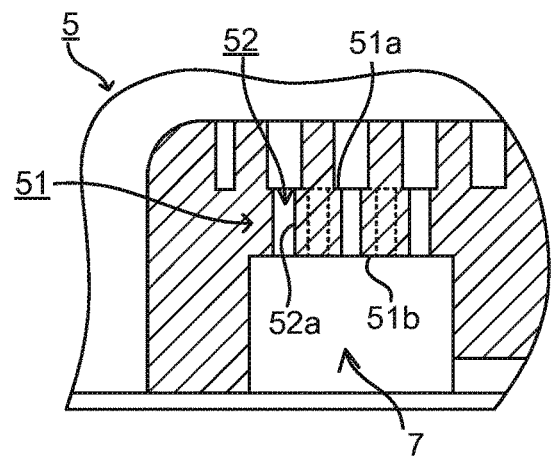
FIGS. 10A to 10C are schematic views illustrating an exemplary operation of the low-pressure stop filter part.
Figure 10B:
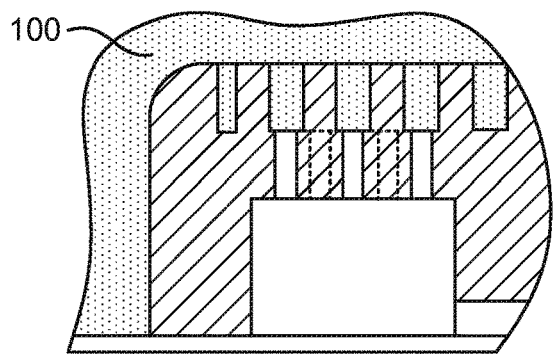
Figure 10C:
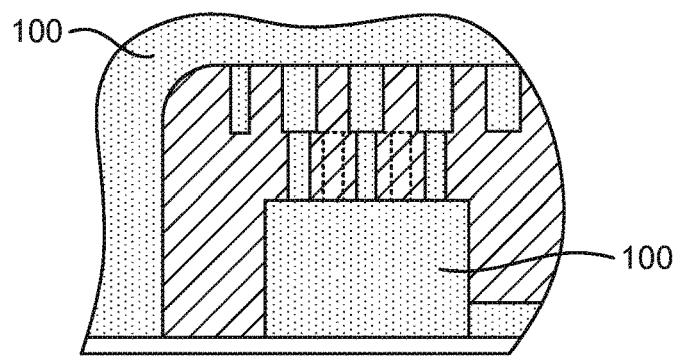
Figure 11:
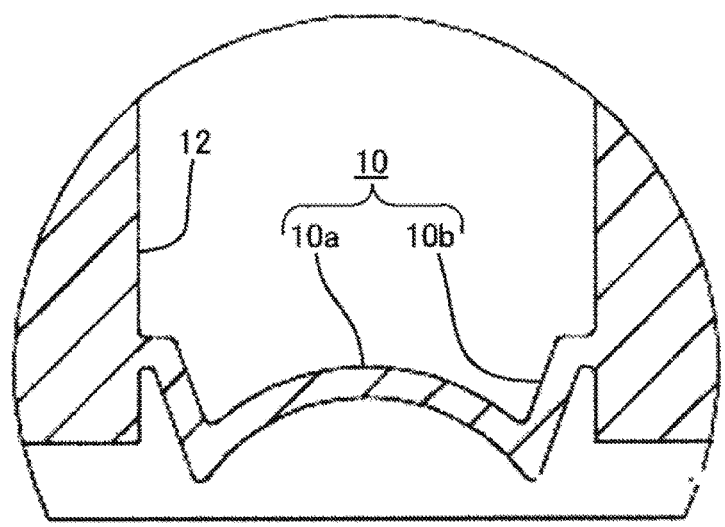
FIG. 11 is an enlarged cross sectional view of a diaphragm part (corresponding to frame D of FIG. 4)

FIGS. 10A to 10C illustrate a specific example of the operation of low-pressure stop filter part 5.

First, when the liquid pressure outside of the flow channel of drip irrigation emitter 1 is 0 MPa, that is, when the irrigation liquid does not exist in drip watering tube 2, low-pressure stop filter part 5 does not limit the inflow of the irrigation liquid as a matter of course, as illustrated in FIG. 10.

Next, when the liquid pressure outside of the flow channel of drip irrigation emitter 1 is lower than 0.005 MPa (the above-described fracture hydraulic pressure), a low-pressure stop filter function based the hydrophobicity of low-pressure stop filter part 5 works as illustrated in FIG. 10B. As a result, irrigation liquid 100 in tube main body 3 is blocked at surface 51a of filter substrate part 51 and at the opening of the upper end of inlet 52. Thus, the inflow of irrigation liquid 100 into the flow channel of drip irrigation emitter 1 is prevented (restricted).

Next, when the liquid pressure outside of the flow channel of drip irrigation emitter 1 is equal to or greater than 0.005 MPa, the liquid pressure outside of the flow channel surpasses the hydrophobicity of low-pressure stop filter part 5 as illustrated in FIG. 10C. Thus, irrigation liquid 100 outside of the flow channel of drip irrigation emitter 1 flows into the flow channel of drip irrigation emitter 1 from inlet 52.

Alternatively, the fracture hydraulic pressure may be 0.01 MPa. From the viewpoint of favorably operating drip irrigation emitter 1 for long-distance watering under a low pressure, it is desirable that the predetermined pressure be not unnecessarily increased, and the above-exemplified fracture hydraulic pressure of 0.01 MPa or the like suffices.

<Hollow Part>

As illustrated in FIG. 4, FIG. 6 and FIG. 7, rear surface 51b of filter substrate part 51 is disposed above bottom end surface 1a. Thus, above bottom end surface 1a (between bottom end surface 1a and top surface 1b), hollow part 7 is defined by the difference of elevation between bottom end surface 1a and rear surface 51b of filter substrate part 51.

Hollow part 7 is connected with each inlet 52 at the downstream end of each inlet 52. The space surrounded by hollow part 7 and inner peripheral surface 3a of tube main body 3 that seals the opening at the lower end of hollow part 7 serves as a part of the flow channel of drip irrigation emitter 1. That is, immediately after entering from inlet 52, the irrigation liquid flows in the space (the flow channel) between hollow part 7 and inner peripheral surface 3a of tube main body 3

<Details of Configuration of Pressure Reduction Channel Part>

In addition, as illustrated in FIG. 6, on the downstream side of the flow channel of drip irrigation emitter 1 relative to low-pressure stop filter part 5, pressure reduction channel part 9 for defining pressure reduction channel 8 that is a part of the flow channel of drip irrigation emitter 1 is disposed.

As illustrated in FIG. 2, FIG. 5 and FIG. 6, pressure reduction channel part 9 is a long groove that is defined in bottom end surface 1a from low-pressure stop filter part 5 side (left side) toward ejection port 4 side (right side) in a meandering shape (or in other words, stream line shape)

meandering in a left-right direction. The long groove is a recess (recessed line) recessed from bottom end surface 1a.

Pressure reduction channel 8 is defined as a space surrounded by pressure reduction channel part 9 and inner peripheral surface 3a of tube main body 3 that shields meander-shaped opening 9a of pressure reduction channel part 9 (long groove).

As illustrated in FIG. 5 and FIG. 6, the upstream end of pressure reduction channel part 9 is connected with the center portion of right inner surface 7a of hollow part 7. Thus, pressure reduction channel 8 is connected to hollow part 7, at a part on the downstream side of hollow part 7.

The irrigation liquid having entered from low-pressure stop filter part 5 flows into pressure reduction channel 8 from the upstream end of pressure reduction channel 8, after passing through hollow part 7 (a part of the flow channel).

In pressure reduction channel 8, the irrigation liquid having entered pressure reduction channel 8 flows toward ejection port 4 side (downstream end side). Since pressure reduction channel 8 has a meandering shape, the pressure drop of the irrigation liquid flowing through pressure reduction channel 8 is high. Thus, the flow of the irrigation liquid can be achieved while efficiently reducing the pressure of the irrigation liquid.

<Details of Configuration of Diaphragm Part>

As illustrated in FIG. 4 to FIG. 6, diaphragm part 10 is disposed at the downstream end of pressure reduction channel part 9.

Diaphragm part 10 is so disposed as to face inner peripheral surface 3a of tube main body 3 from the upper side in FIG. 4 and FIG. 6 (central axis side of tube main body 3), that is, diaphragm part 10 is so disposed as to be deformed toward inner periphery 3a. In addition, diaphragm part 10 is partially exposed to the outside of the flow channel of drip irrigation emitter 1 from the side opposite to inner periphery 3a (central axis side of tube main body 3), in such a manner as to be exposed to the liquid pressure of the irrigation liquid outside of the flow channel of drip irrigation emitter 1. The phrase "partially exposed" means that a part of diaphragm part 10 is in communication with the outside of drip irrigation emitter 1.

In addition, as illustrated in FIG. 6, diaphragm part 10 is disposed at a position shifted toward the upstream side (left side) of the flow channel from a position which faces ejection port 4 from the upper side (a position immediately above ejection port 4). For example, diaphragm part 10 is disposed between ejection port 4 and pressure reduction channel part 9 in the flow channel.

Further, as illustrated in FIG. 4 to FIG. 6 and FIG. 11, diaphragm part 10 includes thin-dome shaped central wall part 10a and thin-peripheral wall part 10b provided around central wall part 10a. Central wall part 10a has a circular shape in plan view and bottom view. In addition, as illustrated in FIG. 4 and FIG. 6, central wall part 10a has, in longitudinal sectional view, an arch shape (curved shape) that protrudes toward the side opposite to inner peripheral surface 3a of tube main body 3 (toward the upper side in FIG. 4 and FIG. 6, or in a direction away from inner periphery 3a). To be more specific, the outer periphery end portion of central wall part 10a is provided on a plane in parallel with top surface 1b and bottom end surface 1a, and the center of central wall part 10a largely protrudes away from inner peripheral surface 3a of tube main body 3 in comparison with the other portions. Peripheral wall part 10b has an annular shape in plan view and bottom view. As illustrated in FIG. 4 to FIG. 6, peripheral wall part 10b is connected with the outer peripheral end of central wall part 10a so as to surround central wall part 10a. In addition, peripheral wall part 10b has a tapered cylinder shape that is flaring from central wall part 10a toward the outside in a direction away from inner peripheral surface 3a of tube main body 3. In other words, peripheral wall part 10b has a shape that surrounds central wall part 10a, and gradually expands in a direction away from inner periphery 3a. It is to be noted that each of central wall part 10a and peripheral wall part 10b may have a thickness of 0.1 mm.

Furthermore, as illustrated in FIG. 3, FIG. 4 and FIG. 6, at a position in top surface 1b and immediately above diaphragm part 10, opening part 12 having a cylindrical inner peripheral surface is provided as a recess in a region from top surface 1b to the top surface of diaphragm part 10. In a sense, opening part 12 opens to top surface 1b, connects the outside and the flow channel together, and diaphragm part 10 is fixed in such a manner that the edge of peripheral wall part 10b makes close contact with the peripheral wall of opening part 12. In this sense, the above-mentioned connection is shielded by diaphragm part 10.

With opening part 12, diaphragm part 10 is partially (only at the top surface of diaphragm part 10) exposed to the outside of the flow channel of drip irrigation emitter 1.

In addition, diaphragm part 10 is disposed at a recessed position nearer to inner peripheral surface 3a of tube main body 3 (lower side) relative to top surface 1b by the thickness (in other words, depth) of opening part 12.

In accordance with the liquid pressure of the irrigation liquid having entered opening part 12 outside of the flow channel of drip irrigation emitter 1, diaphragm part 10 deforms toward inner peripheral surface 3a of tube main body 3. Thus, the height (in other words, cross-sectional size) of the flow channel of drip irrigation emitter 1 at the position where diaphragm part 10 is disposed is limited such that the height (cross-sectional size) decreases as the liquid pressure increases.

<Other Configurations>

Furthermore, as illustrated in FIG. 6, on the downstream side of diaphragm part 10, outlet 14 as a space upwardly recessed from bottom end surface 1a is disposed, and ejection port 4 is disposed immediately below outlet 14.

Outlet 14 functions as a channel that leads, to ejection port 4, the irrigation liquid whose flow rate is limited by the limitation on the height (cross-sectional area) of the flow channel by diaphragm part 10. The irrigation liquid is ejected out of drip watering tube 2 from ejection port 4.

In addition, as illustrated in FIG. 5, at a position in the vicinity of diaphragm part 10 on the recessed bottom surface of outlet 14, a plurality of blocking protrusions 17 are disposed. Blocking protrusions 17 are configured to prevent plant roots, small rocks, sand, insects and the like (hereinafter referred to as foreign matters) having intruded from ejection port 4 from being further intruding into pressure reduction channel 8.

Further, as illustrated in FIG. 5, on the front and rear sides of pressure reduction channel part 9 (on the both sides in a direction in which pressure reduction channel 8 extends), blocking grooves 15 are disposed. Blocking grooves 15 guide foreign matters having intruded from outlet 14 to the front and rear of pressure reduction channel 8, to thereby prevent the foreign matters from further intruding into pressure reduction channel 8.

<Operation and Effect of Embodiment>

In Embodiment, only the irrigation liquid in tube main body 3 whose liquid pressure is equal to or greater than the predetermined liquid pressure passes through inlet 52 of low-pressure stop filter part 5 and flows into the flow channel of drip irrigation emitter 1. Then, after the irrigation liquid passes through hollow part 7, the pressure of the irrigation liquid is reduced due to the pressure drop by the form of pressure reduction channel 8.

Then, after the pressure is reduced at pressure reduction channel 8, the irrigation liquid passes through diaphragm part 10. At this time, diaphragm part 10 is deformed toward inner peripheral surface 3*a* of tube main body 3 by the liquid pressure of the irrigation liquid having entered opening part 12 outside of the flow channel of drip irrigation emitter 1. Thus, the height of the flow channel is reduced by the deformed amount. The height of the flow channel is limited in this manner.

Therefore, the flow rate of the irrigation liquid that passes through diaphragm part 10 and advances toward ejection port 4 is limited by the influence of the limitation on the height of the flow channel by diaphragm part 10.

Here, two drip irrigation emitters 1 relatively disposed on the upstream side and downstream side are described.

First, in drip irrigation emitter 1 on the relatively upstream side, the liquid pressure of the irrigation liquid outside of the flow channel is relatively high. Thus, the amount of the irrigation liquid that flows into the flow channel of drip irrigation emitter 1 is relatively large. At the same time, the amount of deformation of diaphragm part 10 is relatively large, and the amount of the flow limited by diaphragm part 10 is also relatively large. This prevents the ejection amount of the irrigation liquid from ejection port 4 from being excessively increased.

On the other hand, in drip irrigation emitter 1 on the relatively downstream side, the liquid pressure of the irrigation liquid outside of the flow channel is relatively low. Thus, the amount of the irrigation liquid that flows into the flow channel of drip irrigation emitter 1 is relatively low. At the same time, the amount of deformation of diaphragm part 10 is relatively low, and the amount of the flow limited by diaphragm part 10 is relatively small. Thus, the ejection amount of the irrigation liquid from ejection port 4 is not excessively reduced.

In this manner, the ejection amount of the irrigation liquid from each of ejection ports 4 is favorably controlled such that non-uniformity in the ejection amount of the irrigation liquid from ejection ports 4 between the upstream side and downstream side is reduced (to 5 to 10%).

Next, the operation of diaphragm part 10 in Embodiment is described. FIG. 12 illustrates a specific example of the operation of diaphragm part 10. In this example, the fracture hydraulic pressure of diaphragm part 10 is 0.01 MPa.

Figure 12A:
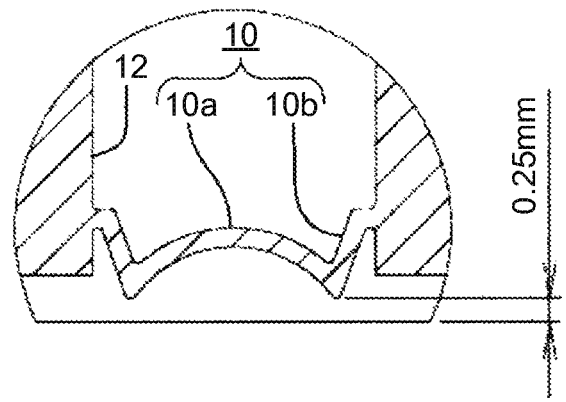
FIGS. 12A to 12C are schematic views illustrating an exemplary operation of the diaphragm part.
Figure 12B:
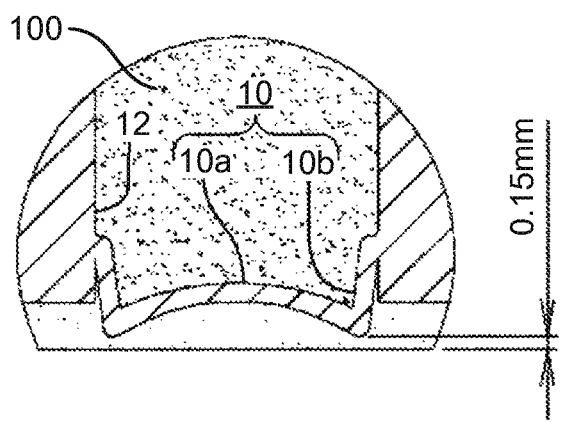
Figure 12C:
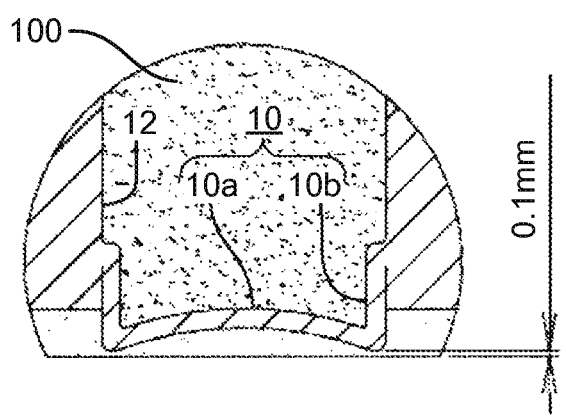

In the specific example of FIGS. 12A to 12C, first, when the liquid pressure is 0 MPa, that is, when no irrigation liquid exists in drip watering tube 2, the limitation on the height of the flow channel by diaphragm part 10 is not performed as a matter of course as illustrated in FIG. 12A. The height of the flow channel in this case is 0.25 mm, for example. It is to be noted that, as illustrated in FIG. 12A, the height of the flow channel is defined as the shortest distance between the point where central wall part 10*a* and peripheral wall part 10*b* are connected, which is the lower end portion of diaphragm part 10, and inner peripheral surface 3*a* of tube main body 3.

Next, when the liquid pressure is equal to or greater than 0.01 MPa (the above-described fracture hydraulic pressure) and smaller than 0.05 MPa, diaphragm part 10 is downwardly deformed by the liquid pressure of irrigation liquid 100 outside of the flow channel as illustrated in FIG. 12B. Thus, the point where central wall part 10*a* and peripheral wall part 10*b* are connected is put down, and as a result, the height of the flow channel is limited to 0.15 mm.

Next, when the liquid pressure is equal to or greater than 0.05 MPa and equal to or smaller than 0.1 MPa, diaphragm part 10 is downwardly deformed more than the case of FIG. 12B as illustrated in FIG. 12C. Thus, the point where central wall part 10*a* and peripheral wall part 10*b* are connected is further put down, and as a result, the height of the flow channel is limited to 0.1 mm.

According to Embodiment, by the hydrophobicity of low-pressure stop filter part 5, the lower limit of the liquid pressure of the irrigation liquid that flows into the flow channel of drip irrigation emitter 1 can be controlled at a pressure lower than that of the conventional case (specifically, in the case where the pressure is mechanically controlled by the elasticity of the diaphragm). Thus, even when the liquid pressure of the irrigation liquid outside of the flow channel of drip irrigation emitter 1 is low, the irrigation liquid can be properly used for drip irrigation.

In addition, when hydrophobicity is provided at at least surface 51*a* of filter substrate part 51 of low-pressure stop filter part 5, a portion of low-pressure stop filter part 5 exposed to the irrigation liquid of the flow channel of drip irrigation emitter 1 has hydrophobicity. Thus, the inflow of the irrigation liquid into the flow channel of drip irrigation emitter 1 can be properly controlled.

Further, when inner peripheral surface 52*a* of inlet 52 has hydrophobicity, the inflow of the irrigation liquid can be further properly controlled by surely suppressing capillarity in inlet 52.

Furthermore, when low-pressure stop filter part 5 is made of a hydrophobic material, the hydrophobicity of low-pressure stop filter part 5 can be achieved with a small number of components.

In addition, when the hydrophobicity of low-pressure stop filter part 5 is achieved by hydrophobic coating, the hydrophobicity of low-pressure stop filter part 5 is obtained regardless of the material of low-pressure stop filter part 5. Thus, the degree of freedom of selection of the material of low-pressure stop filter part 5 can be improved.

Further, when an irregularity is formed on the surface of low-pressure stop filter part 5 having the hydrophobicity, the lower limit of the liquid pressure of the irrigation liquid that flows into the flow channel of drip irrigation emitter 1 can be adjusted to a slightly high level. Thus, when drip irrigation emitter 1 is used under a low pressure, the degree of freedom of selection of the liquid pressure of the entering irrigation liquid can be improved.

Furthermore, by providing diaphragm part 10, even when drip irrigation emitter 1 is used under a high pressure, the ejection amount of the irrigation liquid can be properly controlled.

In addition, small-sized and inexpensive drip irrigation emitter 1 which is excellent in control of the ejection rate can be accurately manufactured in reduced steps by integral molding of a resin material. In this manner, the volume occupancy of drip irrigation emitter 1 in tube main body 3 can be reduced. Thus, excessive pressure drop of the irrigation liquid in tube main body 3 can be prevented. As a result, even when the liquid pressure of the irrigation liquid supplied from the water source side to drip watering tube 2 is low, a liquid pressure enough to allow the liquid to pass through low-pressure stop filter part 5 can be ensured also on the downstream side of tube main body 3. Consequently, long-distance watering can be properly performed at a stable ejection rate. In addition, since drip irrigation emitter 1 is integrally molded, malfunction of diaphragm part 10 due to assembly error is not caused. Thus, the ejection amount of the irrigation liquid can be further stabilized. Further, it is not necessary to use expensive materials such as silicone rubber for diaphragm part 10, and, basically, one inexpensive resin material may be used. Therefore, manufacturing cost can be reduced. In addition, in comparison with the case where three components are assembled as disclosed in PTL 1, the number of components and manufacturing steps can be surely reduced, and therefore reduction in manufacturing cost can be achieved.

Further, diaphragm part 10 disposed on the downstream side of pressure reduction channel part 9 can properly and efficiency limit the height of the flow channel by utilizing the difference in pressure between the irrigation liquid in the flow channel whose pressure has been reduced by pressure reduction channel 8, and the irrigation liquid outside of the flow channel to which diaphragm part 10 is exposed. That is, since the liquid pressure of the irrigation liquid in the flow channel whose liquid pressure has been reduced is sufficiently low, the liquid pressure of the irrigation liquid in the flow channel does not hinder the deformation operation of diaphragm part 10 by the irrigation liquid outside of the flow channel having a relatively high pressure.

Furthermore, diaphragm part 10 is disposed at a position shifted from a position immediately above ejection port 4 along the flow direction of the flow channel, and thus, even when foreign matters intrude from ejection port 4, it is possible to prevent the foreign matters from having an influence on the operation of diaphragm part 10.

In addition, when central wall part 10a receives a liquid pressure from the upper side, diaphragm part 10 is deflected so as to cancel the upward curvature and expanded outward in the radial direction, by utilizing the elasticity of the resin material itself. At the same time, peripheral wall part 10b turns downward with a connecting point (annular connecting section) where peripheral wall part 10b and opening part 12 are connected as the turning axis. Thus, the connecting point between peripheral wall part 10b and central wall part 10a for determining the height of the flow channel can be smoothly displaced downward. Thus, diaphragm part 10 has a shape suitable for efficiently receiving the liquid pressure of the irrigation liquid outside of the flow channel so as to be deformed toward inner peripheral surface 3a of tube main body 3 (downward). Consequently, the height of the flow channel can be further properly limited.

Further, diaphragm part 10 can be readily disposed at a position near inner peripheral surface 3a of tube main body 3 in terms of designing and manufacturing, in such a manner that the liquid pressure of the irrigation liquid outside of the flow channel can be properly received. Thus, the deformation amount of the diaphragm part 10 required for limiting the height of the flow channel can be limited. As a result, the durability of thin diaphragm part 10 can be ensured and a long product lifetime can be achieved.

Furthermore, in the case where a plurality of drip irrigation emitters 1 are respectively disposed at a plurality of ejection ports 4, the ejection amount of the irrigation liquid from ejection ports 4 can be favorably controlled with the above-described operation of diaphragm part 10 such that difference in the amount of the ejected irrigation liquid among the ejection ports 4 on the upstream side and downstream side is small (limited to 5 to 10%). This effect can be surely achieved even in the case of a long-distance watering using irrigation liquid having a low liquid pressure, since the structure of diaphragm part 10 of drip irrigation emitter 1 is designed such that the pressure drop in tube main body 3 is moderated as described above.

It should be noted that, the present invention is not restricted to the above-mentioned Embodiment, and may be variously modified as far as the features of the present invention are included. For example, drip irrigation emitter 1 may have a configuration in which: low-pressure stop filter part 5 is provided; and diaphragm part 10 is not provided or other diaphragm part is provided. In this case, drip irrigation emitter 1 has at least an effect other than the effect of low-pressure stop filter part 5 among the above-described effects. In addition, drip irrigation emitter 1 may have a configuration in which: diaphragm part 10 is provided; and low-pressure stop filter part 5 is not provided or other inflow part is provided. In this case, drip irrigation emitter 1 has at least an effect other than the effect of diaphragm part 10 among the above-described effects.

For example, the present invention can be effectively applied even to the triple-component drip irrigation emitter disclosed in PTL 1.

This application is entitled to and claims the benefit of Japanese Patent Application Nos. 2012-118551 and 2012-118552 filed on May 24, 2012, the disclosure each of which including the specification, drawings and abstract is incorporated herein by reference in its entirety.

INDUSTRIAL APPLICABILITY

According to the present invention, it is possible to easily provide a drip irrigation emitter in which suitable dropping of irrigation liquid is properly performed using the pressure irrigation liquid to be dropped. Therefore, it is expected that the emitter is broadly applied in the technical fields of drip irrigation, an endurance test and the like where dropping for a long period of time are desired, and that the further development in the technical fields is achieved.

REFERENCE SIGNS LIST

1 Drip irrigation emitter
2 Drip watering tube
3 Tube main body
3a Inner periphery
4 Ejection port
5 Low-pressure stop filter part
8 Pressure reduction channel
9 Pressure reduction channel part
9a Opening
10 Diaphragm part

The invention claimed is:

1. A drip irrigation emitter for controlling an amount of irrigation liquid ejected through an ejection port of a flow pipe through which the irrigation liquid flows, the ejection port extending through a pipe wall of the flow pipe, the drip irrigation emitter comprising:
   a flow channel that allows the irrigation liquid to flow from an inside of the flow pipe to the ejection port when the drip irrigation emitter is disposed at a position corresponding to the ejection port in an inner peripheral surface of the flow pipe;
   a first plane to be connected to the inner peripheral surface of the flow pipe;
   a second plane to be located on a central axis side of the flow pipe relative to the first plane;
   an inflow part, disposed at the second plane, having hydrophobicity, for introducing the irrigation liquid in the flow pipe into the flow channel while preventing the irrigation liquid having a liquid pressure lower than a predetermined liquid pressure from introducing into the flow channel;

a pressure reduction channel part disposed on a downstream side relative to the inflow part in the channel, the pressure reduction channel part being configured to define a pressure reduction channel, the pressure reduction channel being configured to allow the irrigation liquid entered from the inflow part to flow therethrough toward the ejection port while reducing a pressure of the irrigation liquid; and a diaphragm part that includes:

a central wall part having a curved shape protruding in a direction away from the inner peripheral surface of the flow pipe defining the pressure reduction channel, and a peripheral wall part connected to an outer peripheral edge of the central wall part in such a manner as to surround the central wall part, the peripheral wall part having a shape of a tapered cylinder gradually expanding in the direction away from the inner peripheral surface of the flow pipe;

wherein the inflow part includes:

a substrate part that comprises a front surface included in the second plane, and a rear surface facing the channel, and a plurality of inlets that extend through the substrate part,
wherein the inflow part is composed of a hydrophobic material or hydrophobic coating is applied to the inflow part, wherein the inflow part includes an irregularity provided on a surface having hydrophobicity, and wherein each of the plurality of inlets has a circular opening.

2. The drip irrigation emitter according to claim 1, wherein an inner peripheral surface of each of the inlets has hydrophobicity.

3. The drip irrigation emitter according to claim 1, further comprising a diaphragm part disposed on a downstream side relative to the inflow part in the channel, the diaphragm part being configured to control a cross-sectional size of the flow channel through deformation of the diaphragm part in accordance with the liquid pressure of the irrigation liquid in the flow pipe.

4. The drip irrigation emitter according to claim 3, further comprising an opening part that opens to the second plane, and connects the flow channel and an outside together, wherein the pressure reduction channel part includes a groove recessed from the first plane, the groove being configured to define the pressure reduction channel together with the inner peripheral surface of the flow pipe, wherein the diaphragm part is disposed at the opening part such that the diaphragm part is partially exposed to the outside and that the diaphragm part is deformed toward the inner peripheral surface of the flow pipe that defines the pressure reduction channel, and wherein the inflow part, the pressure reduction channel part and the diaphragm part are integrally formed with a resin material.

5. A drip irrigation apparatus comprising:

a flow pipe through which irrigation liquid flows, the flow pipe including an ejection port that extends through a pipe wall; and the drip irrigation emitter according to claim 1 disposed on an inner peripheral surface of the flow pipe at a position corresponding to the ejection port, the drip irrigation emitter being configured to control an amount of the irrigation liquid ejected from the ejection port.

6. A drip irrigation emitter for controlling an amount of irrigation liquid ejected through an ejection port of a flow pipe through which the irrigation liquid flows, the ejection port extending through a pipe wall of the flow pipe, the drip irrigation emitter comprising:

a flow channel that allows the irrigation liquid in the flow pipe to flow from an inside of the flow pipe to the ejection port when the drip irrigation emitter is disposed at a position corresponding to the ejection port in an inner peripheral surface of the flow pipe;

an inflow part for introducing the irrigation liquid in the flow pipe into the flow channel;

a pressure reduction channel part disposed on a downstream side relative to the inflow part in the flow channel, the pressure reduction channel part being configured to define a pressure reduction channel together with the inner peripheral surface of the flow pipe, the pressure reduction channel being configured to allow the irrigation liquid entered from the inflow part to flow therethrough toward the ejection port while reducing a pressure of the irrigation liquid;

a diaphragm part disposed on a downstream side relative to the inflow part in the flow channel such that the diaphragm part is partially exposed in the flow pipe, that the diaphragm is exposed to the liquid pressure of the irrigation liquid in the flow pipe, and that the diaphragm is deformed toward the inner peripheral surface of the flow pipe;

a first plane to be connected to the inner peripheral surface of the flow pipe;

a second plane to be located on a central axis side of the flow pipe relative to the first plane; and an opening part that opens to the second plane and the flow channel and connects the flow channel and an outside together, wherein the inflow part is disposed at the second plane, wherein the diaphragm part limits a height of the flow channel such that the height of the flow channel decreases as the liquid pressure increases by being deformed toward the inner peripheral surface of the flow pipe in accordance with the liquid pressure, wherein the inflow part, the pressure reduction channel part and the diaphragm part are integrally formed with a resin material, wherein the diaphragm part includes:

a central wall part having a curved shape protruding in a direction away from the inner peripheral surface of the flow pipe defining the pressure reduction channel, and a peripheral wall part connected to an outer peripheral edge of the central wall part in such a manner as to surround the central wall part, the peripheral wall part having a shape of a tapered cylinder gradually expanding in the direction away from the inner peripheral surface of the flow pipe, wherein a first end of the tapered cylinder is located on the first plane side and a second end of the tapered cylinder is located on the second plane side, the first end having a diameter smaller than a diameter of the second end, wherein the diaphragm part is so disposed in the opening part as to be partially exposed to the outside, and wherein an outer peripheral edge of the peripheral wall part is fixed to an inner peripheral surface of the opening part such that a surface of the peripheral wall part comes into contact with the inner peripheral surface of the opening part when the diaphragm part is deformed toward the inner peripheral surface of the flow pipe.

7. The drip irrigation emitter according to claim 6, wherein the diaphragm part is disposed between the ejection port and the pressure reduction channel part in the flow channel.

8. A drip irrigation apparatus comprising:
a flow pipe through which irrigation liquid flows, the flow pipe including an ejection port that extends through a pipe wall; and
the drip irrigation emitter according to claim 6 disposed on an inner peripheral surface of the flow pipe at a position corresponding to the ejection port, the drip irrigation emitter being configured to control an amount of the irrigation liquid ejected from the ejection port.

9. The drip irrigation emitter according to claim 6, wherein the central wall part has a circular shape in plan view and the peripheral wall part has an annular shape in plan view.

* * * * *